(12) United States Patent
Micheli et al.

(10) Patent No.: US 11,021,080 B2
(45) Date of Patent: Jun. 1, 2021

(54) SECTION INSULATOR FOR AN OVERHEAD CONTACT LINE

(71) Applicant: ALSTOM TRANSPORT TECHNOLOGIES, Saint-Ouen (FR)

(72) Inventors: Silvano Micheli, Abbadia Lariana (IT); Cristian Bormetti, Como (IT)

(73) Assignee: ALSTOM TRANSPORT TECHNOLOGIES, Saint-Ouen (FR)

(*) Notice: Subject to any disclaimer, the term of this patent is extended or adjusted under 35 U.S.C. 154(b) by 306 days.

(21) Appl. No.: 16/173,741

(22) Filed: Oct. 29, 2018

(65) Prior Publication Data

US 2019/0126776 A1 May 2, 2019

(30) Foreign Application Priority Data

Oct. 31, 2017 (EP) .................................. 17306497

(51) Int. Cl.
| | |
|---|---|
| B60M 1/18 | (2006.01) |
| B60M 1/30 | (2006.01) |
| B60M 1/24 | (2006.01) |
| H01B 17/02 | (2006.01) |

(52) U.S. Cl.
CPC ............... B60M 1/18 (2013.01); B60M 1/24 (2013.01); B60M 1/307 (2013.01); H01B 17/02 (2013.01)

(58) Field of Classification Search
CPC .......... B60M 1/18; B60M 1/24; B60M 1/307; H01B 17/02
See application file for complete search history.

(56) References Cited

U.S. PATENT DOCUMENTS

| | | | | | |
|---|---|---|---|---|---|
| 1,773,192 | A | * | 8/1930 | Matthes | ................... B60M 1/18 191/39 |
| 4,250,982 | A | * | 2/1981 | Senften | ................... B60M 1/18 191/39 |
| 4,424,889 | A | * | 1/1984 | Hockele | ................... B60M 1/18 191/39 |

(Continued)

FOREIGN PATENT DOCUMENTS

| | | |
|---|---|---|
| EP | 0064442 A1 | 4/1981 |
| GB | 1315839 A | 5/1973 |

OTHER PUBLICATIONS

European Search Report dated Apr. 12, 2018 during the prosecution of European Patent Application No. EP 17 30 3497.

(Continued)

*Primary Examiner* — Jason C Smith
(74) *Attorney, Agent, or Firm* — Troutman Pepper Hamilton Sanders LLP

(57) ABSTRACT

Section insulator for an overhead contact line arranged for being placed between two isolated sections of said overhead contact line, said section insulator having an insulating element placed between two contact wires of two adjacent sections of an overhead line; two clamps respectively connected on one side to a respective contact wire and on the other side to a connecting plate arranged for being in turn connected to the insulating element, so that the tensile force due to the contact wires applies along the axis of the insulating bar; and supporting means directly connected to the insulating element through the connecting plates and arranged for supporting the section insulator to the overhead line.

5 Claims, 4 Drawing Sheets

(56) References Cited

U.S. PATENT DOCUMENTS

| | | | |
|---|---|---|---|
| 6,206,156 B1* | 3/2001 | Nunlist | B60M 1/18 |
| | | | 191/22 R |
| 2010/0133055 A1* | 6/2010 | Melis Maynar | B60M 1/18 |
| | | | 191/39 |
| 2014/0144672 A1* | 5/2014 | Furrer | B60M 1/18 |
| | | | 174/138 R |
| 2016/0272088 A1* | 9/2016 | Furrer | B60M 1/18 |
| 2019/0126776 A1* | 5/2019 | Micheli | B60M 1/307 |

OTHER PUBLICATIONS

Ganshorn R-D et al: "Light-Weight Section 1-6 Insulator for Overhead Contact Lines//Leichtbau-Streckentrenner Fuer Oberleitungen//Isolateur De Section Leger Pour Catenaire", EB-Elektrische Bahnen, Div-Deutscher Industrieverlag, vol. 103, No. 7, Jul. 1, 2005 (Jul. 1, 2005), pp. 338-345, XP001232744.

* cited by examiner

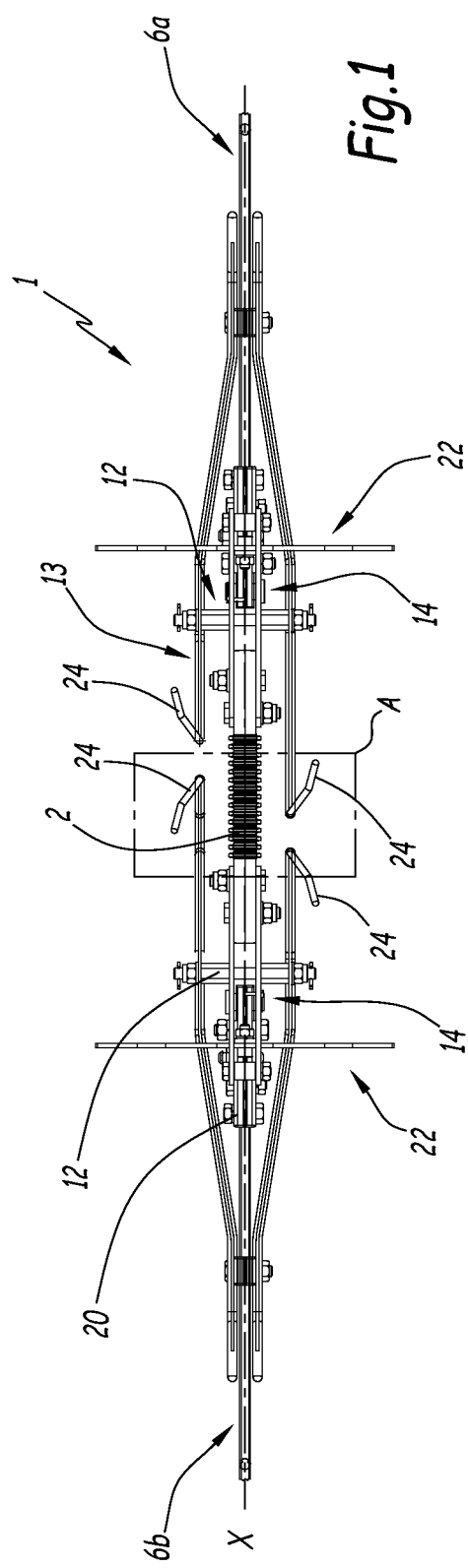
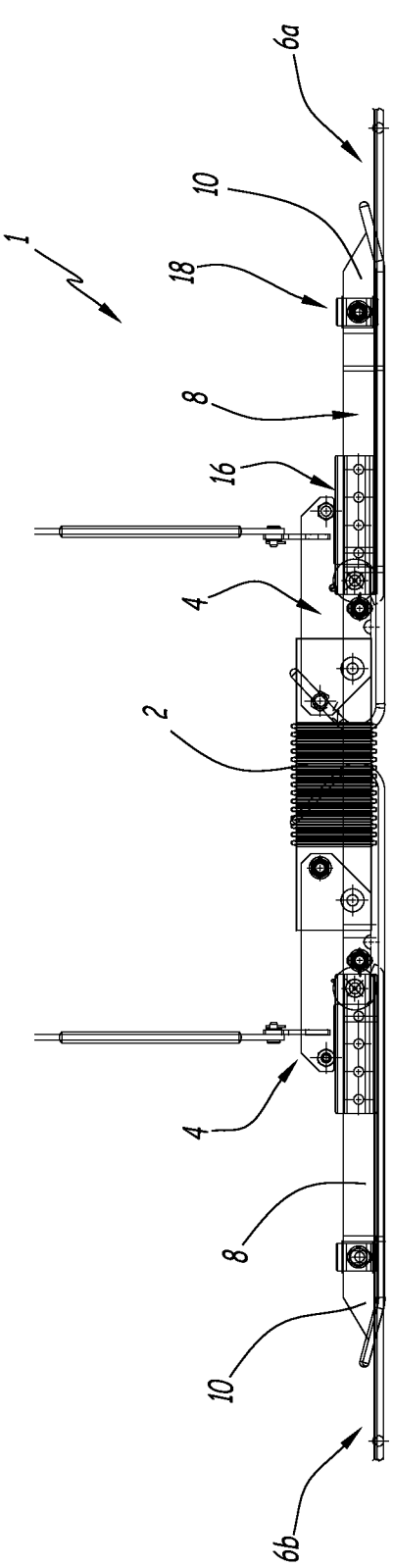

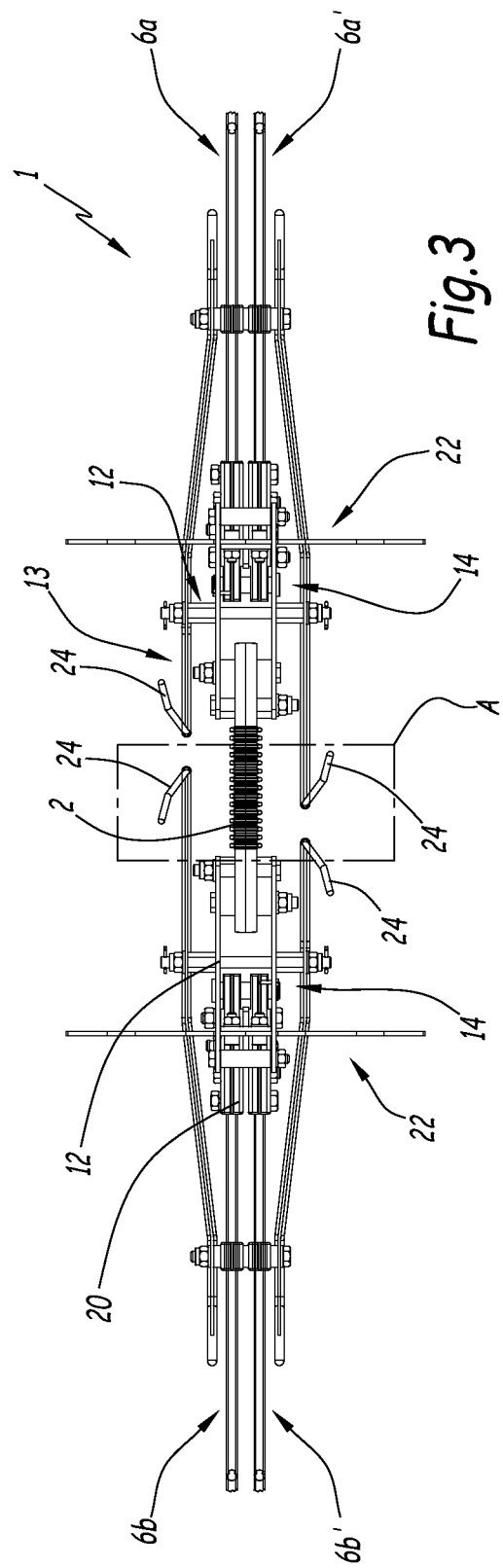
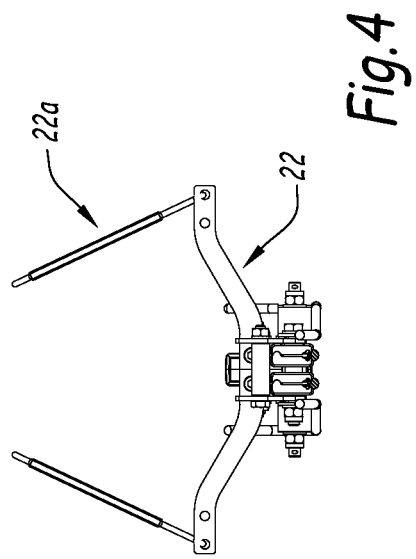

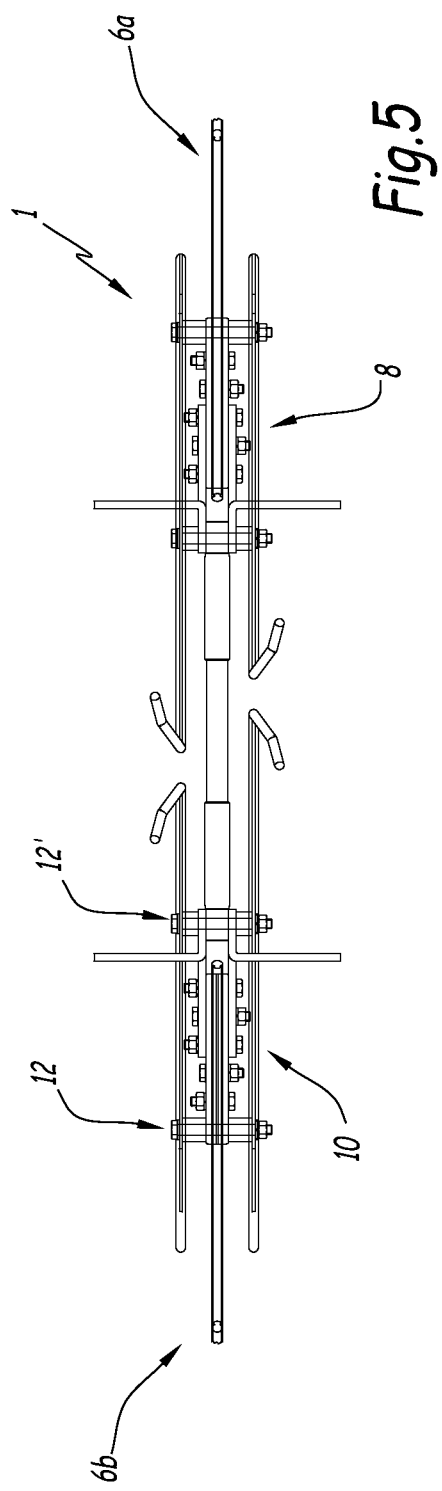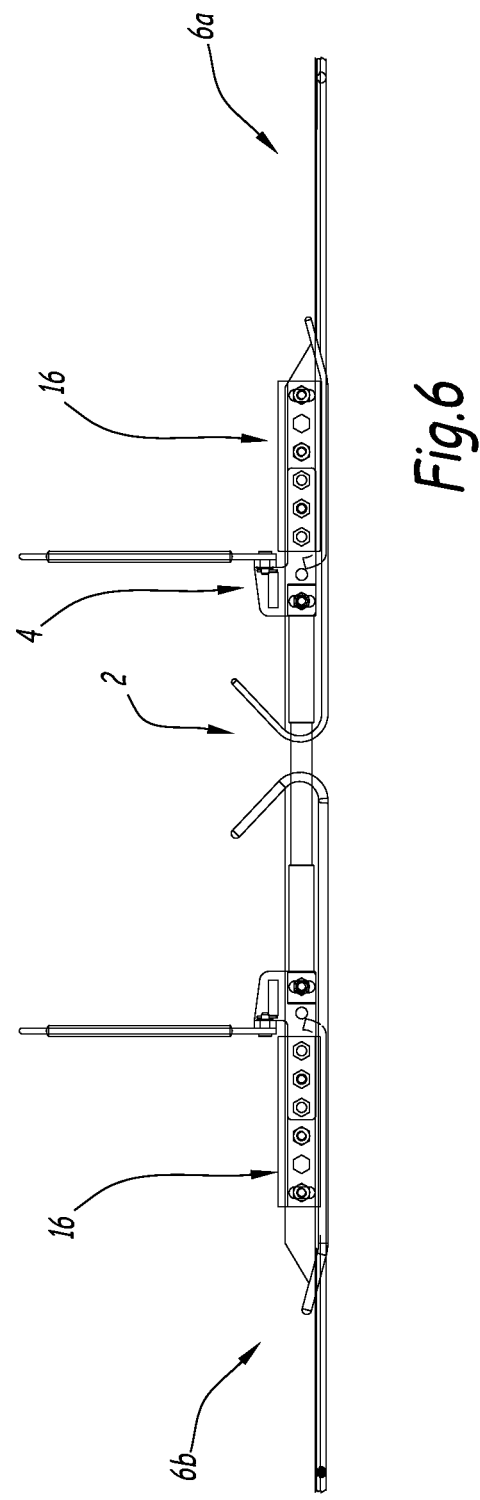

SECTION INSULATOR FOR AN OVERHEAD CONTACT LINE

CROSS-REFERENCE TO RELATED APPLICATIONS

The present application claims priority from European Patent Application No. EP 17306497.3 filed Oct. 31, 2017. The entire contents of which are incorporated herein by reference.

FIELD OF THE INVENTION

The present invention relates to the field of supply of vehicles at electric traction.

More specifically, the present invention relates to a section insulator for an overhead contact line intended for supplying electric traction vehicles.

The section insulators are devices designed for subdividing an overhead contact line into individually electrical isolated sections accessible by pantographs.

The purpose of section insulators is therefore to insulate two adjacent areas of an overhead contact line having a same voltage.

BACKGROUND

Section insulators are known in the art, such as for example from document EP 0064442 or document FR 2537513, however, these insulators are heavy, with a complex structural design, difficult to install and expensive.

There is therefore the need to have an innovative section insulator which is light, with a simple geometric design and cheap, thus overcoming the limitations of the prior art solutions.

SUMMARY

These and other objects are achieved by a section insulator for an overhead contact line having the characteristics defined in claim 1.

Preferred embodiments of the invention are the subject matter of the dependent claims, whose content is to be understood as forming an integral part of the present description.

BRIEF DESCRIPTION OF DRAWINGS

Further characteristics and advantages of the present invention will become apparent from the following description, provided merely by way of non-limiting example, with reference to the enclosed drawings, in which:

FIG. 1 shows a top view of a section insulator for one contact wire according to the present invention;

FIG. 2 shows a lateral view of the section insulator of FIG. 1;

FIG. 3 shows a top view of the section insulator for two contact wires;

FIG. 4 shows a transversal section of the section insulator of FIGS. 1 and 3;

FIG. 5 shows a top view of an alternative embodiment of the section insulator for one contact wire according to the present invention;

FIG. 6 shows a lateral view of the section insulator of FIGS. 5 and 7

Figure 7:
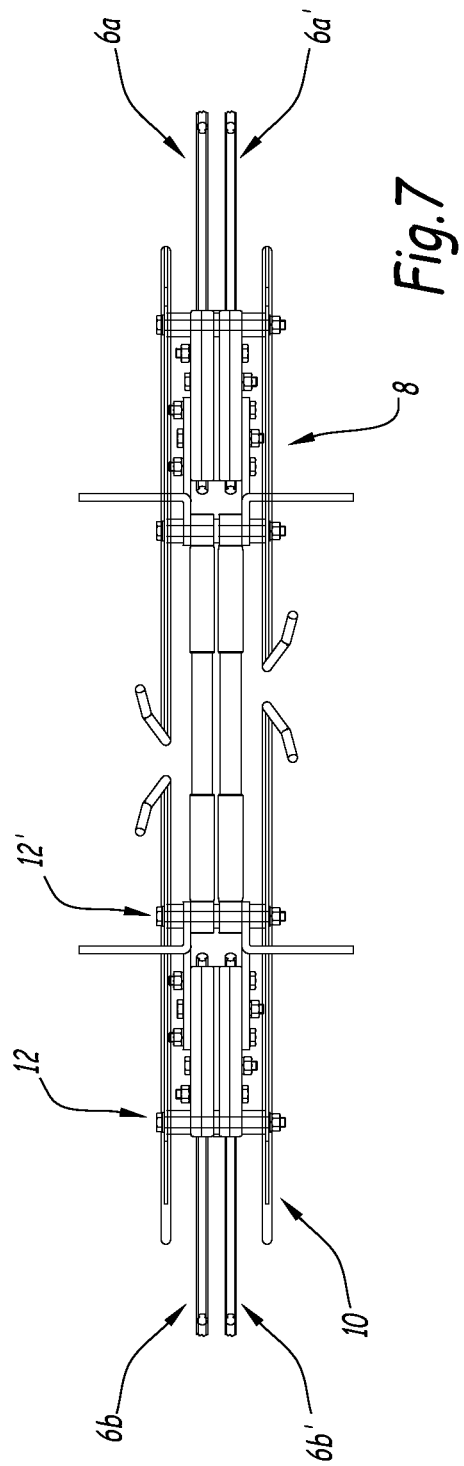
FIG. 7 shows a top view of an alternative embodiment of the section insulator for two contact wires.

Briefly, the section insulator of the present invention comprises a single insulating element linked with stainless steel plates to respective clamps (one clamp on each side of insulator); the clamp is connected on one side to contact wires of an overhead contact line, and on the other side to the stainless steel plates 4, so that the tensile force due to the contact wires applies along the axis of the insulating element. Supporting arms are directly connected to the stainless steel plates for supporting the section insulator to the overhead contact line.

FIG. 1 shows a top view of a section insulator 1 according to the present invention while FIG. 2 shows a lateral view of the section insulator of FIG. 1.

The section insulator 1 comprises an insulating element 2, preferably of rectangular shape, and two connecting plates 4 (one on each end of the insulating element 2) for connecting the insulating element 2 to respective contact wires 6a, 6b of an overhead contact line through respective main clamps 16. Two respective short slideways 8 and long slideways 10 are arranged to be connected with the connecting plates 4 through spacers 12 for realizing a tract of overlap which ensures electrical continuity to the passage of the pantograph, thus avoiding trigger.

The overhead contact line comprises, as known in the art, two adjacent insulated sections connected each other through the section insulator 1.

The section insulator 1 further comprises, as above cited, two spacers 12 placed perpendicularly to a longitudinal axis X of the section insulator 1, said longitudinal axis X extending parallel to the contact wires 6a, 6b.

The spacers 12 are fixed at one end to the respective slideway 8 and 10 and at the other end to the respective connecting plate 4 of the section insulator 1.

Two pins 14 placed next to the respective spacer 12 and fixed to the connecting plate 4 are arranged to connect the respective main clamp 16 to the respective connecting plate 4 not rigidly, so that the main clamp 16 can absorb the vibrations of the contact wire 6a, 6b.

On each side of the section insulator 1 there are therefore the main clamp 16 and an auxiliary clamp 18, respectively arranged for being connected on one side to a respective contact wire 6a, 6b and on the other side to the connecting plate 4, so that the tensile force due to the contact wires 6a, 6b applies along the longitudinal axis X of the insulating element 2.

A distance element 20 is placed next to the pins 14 and is a spacer between two plates that form each connecting plates 4.

Two support arms 22 (see FIG. 4) are respectively connected to the connecting plates 4 and are arranged for supporting, in a manner known per se, the section insulator 1 to the overhead contact line, through supporting members 22a.

As above indicated the section insulator 1 comprises the slideways 8 and 10 which are provided with horns 24 on one end. The four slideways 8, 10 with horns 24 create an overlap region 24' that guarantees that a pantograph moving on the contact wires 6a, 6b is always under tension, thus preventing electrical arcs which may damage the pantograph itself.

In the overlap region there is electrical continuity for the pantograph which moves from on section to the next adjacent one.

The sidewall horns 24 extinguish any accidental discharge that may occur between the two isolated sections of the overhead contact, by bringing the electric discharge on the tips, so as to avoid that the discharge develops down the insulating element 2.

FIG. 3 shows a top view of a section insulator for two contact wires, wherein two respective couples of contact wires 6a, 6a' and 6b, 6b', are present on each side of the electric insulator 1.

FIG. 4 shows a transversal section of the section insulator of FIGS. 1 and 3 wherein the support arms 22 are depicted.

FIG. 5 shows a top view of a section insulator 1' according to an alternative embodiment of the present invention, FIG. 6 shows a lateral view of the section insulator of FIG. 5 and FIG. 7 shows a top view of an alternative embodiment of the section insulator of FIG. 5 including two couples of contact wires 6a, 6a' and 6b, 6b'.

DETAILED DESCRIPTION

Elements similar to those of FIG. 1-FIG. 3 are indicated with the same reference numerals and in FIGS. 5 to 7 only one clamp 16 on each side of the section insulator 1 is shown. In this alternative embodiment, there is a different way to connect the contact wires 6a, 6a', 6b, 6b' with the insulating element 2.

Figure 8:
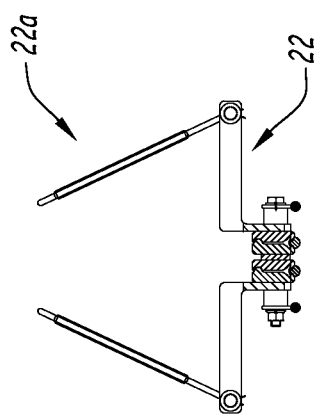
FIG. 8 shows a transversal section of the section insulator of FIGS. 5 and 7.

FIG. 8 shows a transversal section of the section insulator 1' wherein the support arms 22 are depicted.

The section insulator 1 of FIGS. 1 to 4 is made of a rectangular insulating element 2 made of a fiberglass covered with silicone rubber.

Thanks to fiberglass material it is possible reach a very high breaking load, and the silicone covering permits a long life even in the worst environmental conditions.

The rectangular shape allows a good mechanical resistance in all directions, and the short and long sideways 8, 10 are made of copper, which permits a good conductivity.

The support structure of all the above components is made of stainless steel, so that the section insulator 1, 1' has low maintenance costs due to the corrosion-resistant materials employed, and the simple geometric design permits to obtain a low weight and an easy installation.

The overall good rigidity of assembly allows obtaining an high speed of travel for the pantograph.

The section insulator 1' of FIGS. 5 to 8 is made of a circular insulating element 2 made of fiberglass covered with PTFE (Polytetrafluoroethylene) and compressed at the ends with two terminals made of stainless steel.

The section insulator 1, 1' is of a modular type and it allows easy replacement of damage parts and easy adaptation for two contact wires by keeping a suitable and high breaking load. In the embodiment of FIGS. 1 to 4, there is only one insulating element 2, in the embodiment of FIGS. 5 to 8, there is only one insulating element 2 in case of only one contact wire 6a, 6b, and two insulating elements in case of two contacts wires for each side 6a, 6a' and 6b, 6b'. The section insulator 1, 1' of the present invention has the following advantages:

it allows an easier mounting procedure because the central body can be fixed on the overhead line without the slideways and after that, the slideways can be mounted and adjusted exactly;

the rectangular shape of the insulating element 2 allows a better mechanical resistance in the vertical direction;

there is the possibility to use a double round insulator in case of hard tensile force (section insulator 1')

the direct connection of the support arms 22 to the insulating element 2, through the connecting plates 4, permits to support the section insulator 1, 1' to the catenary system of the overhead line with different prior art techniques.

Clearly, the principle of the invention remaining the same, the embodiments and the details of production can be varied considerably from what has been described and illustrated purely by way of non-limiting example, without departing from the scope of protection of the present invention as defined by the attached claims.

The invention claimed is:

1. A section insulator for an overhead contact line arranged for being placed between two isolated sections of said overhead contact line, said section insulator comprising:
    an insulating element placed between two contact wires of two adjacent sections of an overhead line;
    two clamps respectively connected on one side to a respective contact wire and on the other side to a connecting plate arranged for being in turn connected to the insulating element, so that the tensile force due to the contact wires applies along the axis of the insulating bar;
    two spacers fixed at one end to a respective slideway and at the other end to the respective connecting plate;
    two pins placed next to the respective spacer and fixed to the connecting plate, arranged to connect the respective clamp to the respective connecting plate not rigidly, so that the clamp can absorb the vibrations of the contact wire;
    supports directly connected to the insulating element through the connecting plates and arranged for supporting the section insulator to the overhead line; and
    two respective short slideways and two long slideways arranged to realize a tract of overlap which ensures electrical continuity to a passage of a pantograph on said overhead contact line.

2. The section insulator according to claim 1, wherein the supports further comprise supporting members for connection to the overhead line.

3. The section insulator according to claim 1, wherein the insulating element is made of fiberglass covered with silicone rubber.

4. The section insulator according to claim 1, wherein the insulating element is made of fiberglass covered with PTFE.

5. The section insulator of claim 1, further comprising horns on one end of the respective short slideways and long slideways, said horns being arranged to extinguish accidental discharges occurring between the two isolated sections of the overhead contact line, so as to avoid that the discharge develops down the insulating element.

* * * * *